(12) United States Patent
Arora et al.

(10) Patent No.: US 12,500,907 B2
(45) Date of Patent: Dec. 16, 2025

(54) TRACKING DETECTION FOR DATA PROCESSING SYSTEMS USING OUT-OF-BAND METHODS

(71) Applicant: Dell Products L.P., Round Rock, TX (US)

(72) Inventors: Mohit Arora, Frisco, TX (US); Abeye Teshome, Austin, TX (US); Richard M. Tonry, Georgetown, TX (US); Bassem El-Azzami, Austin, TX (US); Vinodkumar Vasudev Ottar, McKinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 18/649,197

(22) Filed: Apr. 29, 2024

(65) Prior Publication Data

US 2025/0337752 A1    Oct. 30, 2025

(51) Int. Cl.
H04L 9/40    (2022.01)
(52) U.S. Cl.
CPC ...... *H04L 63/1416* (2013.01); *H04L 63/1425* (2013.01)
(58) Field of Classification Search
CPC .................. H04L 63/1416; H04L 63/1425

USPC .......................................................... 726/23
See application file for complete search history.

(56) References Cited

U.S. PATENT DOCUMENTS

| | | | |
|---|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,734,169 B2 | 8/2017 | Redlich et al. |
| 10,176,308 B2 | 1/2019 | Mintz et al. |
| 10,298,670 B2 | 5/2019 | Ben-Shael et al. |
| 10,671,765 B2 | 6/2020 | Swierk et al. |
| 11,036,902 B2 | 6/2021 | Nicholas |
| 11,102,122 B2 | 8/2021 | Seed et al. |
| 11,134,380 B2 | 9/2021 | Fox et al. |
| 11,487,274 B2 | 11/2022 | Valder et al. |

(Continued)

*Primary Examiner* — Badri Narayanan Champakesan
(74) *Attorney, Agent, or Firm* — WOMBLE BOND DICKINSON (US) LLP

(57) ABSTRACT

Methods and systems for managing operations of a data processing system are disclosed. To manage operations of the data processing system, a management controller of the data processing system may provide location data for the data processing system to a server via an out-of-band communication channel to identify whether the data processing system is being used for unauthorized tracking purposes. The management controller may then obtain an unauthorized tracking purpose analysis outcome determination via an out-of-band communication channel. If the unauthorized tracking purpose analysis outcome determination indicates that the data processing system is being used to perform unauthorized tracking, an action set may be performed to update an existing operating state of the data processing system to limit an ability of the data processing system to be used to perform the unauthorized tracking.

20 Claims, 8 Drawing Sheets

(56) References Cited

U.S. PATENT DOCUMENTS

| | | |
|---|---|---|
| 11,792,267 B2 | 10/2023 | Kreiner et al. |
| 2004/0049699 A1* | 3/2004 | Griffith ............... H04W 12/122 |
| | | 726/23 |
| 2009/0106836 A1* | 4/2009 | Toshima ................. H04L 63/10 |
| | | 726/22 |
| 2011/0087387 A1 | 4/2011 | Safa-Bakhsh et al. |
| 2011/0209216 A1* | 8/2011 | Zohar ................. G06F 16/9535 |
| | | 726/22 |
| 2016/0036839 A1* | 2/2016 | Shimizu .............. H04L 63/1416 |
| | | 726/23 |
| 2016/0100315 A1* | 4/2016 | Schenkel ............ H04W 12/122 |
| | | 726/4 |
| 2016/0197946 A1* | 7/2016 | Szekely .............. H04L 63/1416 |
| | | 726/23 |
| 2018/0039946 A1 | 2/2018 | Bolte et al. |
| 2018/0124078 A1* | 5/2018 | Hajmasan ........... H04L 63/1408 |
| 2020/0244691 A1* | 7/2020 | Veeramany ......... H04L 63/0236 |
| 2021/0034048 A1 | 2/2021 | Hajizadeh |
| 2021/0073211 A1 | 3/2021 | Wright, Sr. |
| 2022/0038659 A1 | 2/2022 | Michel |
| 2024/0406145 A1* | 12/2024 | Crabtree ............. H04L 63/1425 |

* cited by examiner

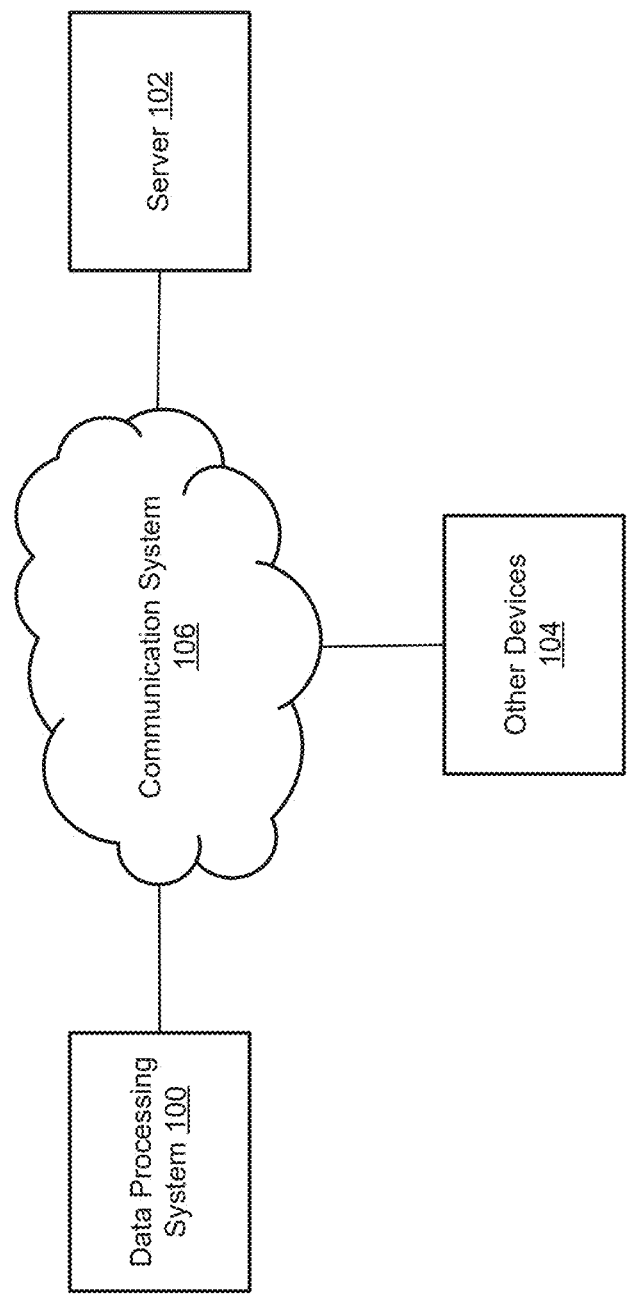

TRACKING DETECTION FOR DATA PROCESSING SYSTEMS USING OUT-OF-BAND METHODS

FIELD

Embodiments disclosed herein relate generally to managing a data processing system. More particularly, embodiments disclosed herein relate to systems and methods for managing data processing systems to reduce unauthorized tracking.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

DETAILED DESCRIPTION

Figure 1B:
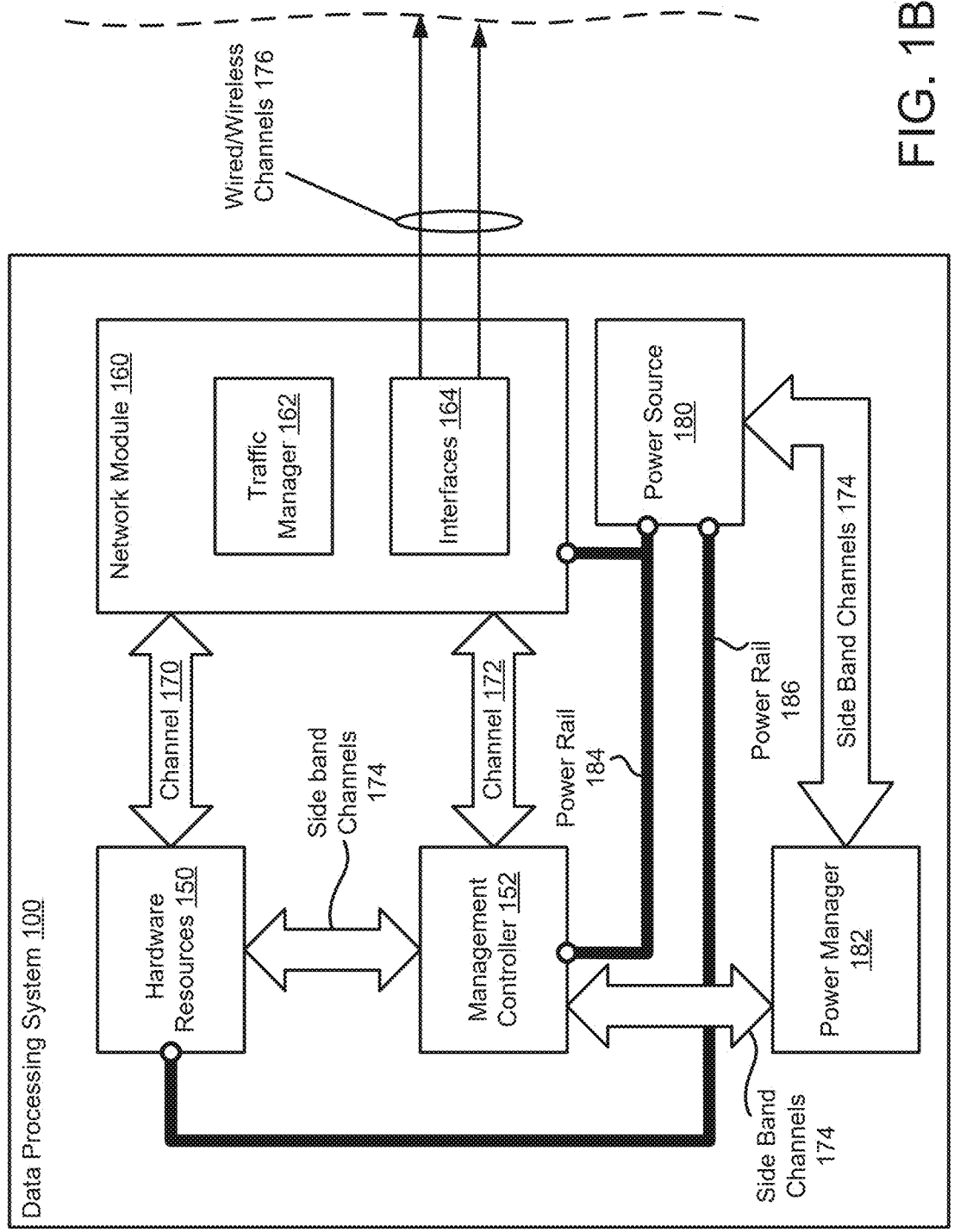
FIG. 1B shows a second block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may include out-of-band components usable for providing location data for the data processing system. The location data may be provided (e.g., to other devices that may participate in the management of the operation of the data processing system) by the out-of-band components via out-of-band network communications.

To provide the location data, the data processing system may include out-of-band components such as a management controller. The management controller may, for example, provide the location data via out-of-band communication channels to a server that may manage the location data and/or map locations of the data processing system over time. The out-of-band communication channels may use a communication network different from the communication network used by in-band communication channels thereby allowing the management controller to provide location data to the server without traversing in-band communication channels of the data processing system.

The use of out-of-band network communications may allow for the ability to obtain and monitor the location data for the data processing system over time, even when the data processing system is unpowered. This ability may allow a user with malicious intent to use the data processing system for unauthorized tracking purposes using the location data. For example, a user with malicious intent may give a person they intend to track the data processing system (e.g., a laptop computer). The user with malicious intent may then obtain the location data for the laptop computer, and by doing so also obtain the location of the person in possession of the laptop computer without their consent.

In order to decrease the likelihood that a user with malicious intent may use a data processing system for unauthorized tracking purposes, the data processing system may provide location data to a server via out-of-band methods. The server may then identify whether the data processing system is being used for unauthorized tracking purposes.

To identify whether the data processing system is being used for unauthorized tracking purposes, the server may also obtain location data from a second device with a known geographical relationship to the data processing system, and/or a device status report indicating whether the data processing system has been physically accessed by an authorized user within a predetermined amount of time. For example, a server may obtain and monitor the location data from the data processing system (e.g., a laptop computer) and a device the data processing system is known to have a geographical relationship with (e.g., a cell phone connected to the laptop computer via Bluetooth pairing). If the laptop computer is moved to a new location and is no longer paired to the cell phone via Bluetooth, the server may determine the laptop computer is being used as a tracking device.

If the server identifies that a data processing system is being used for unauthorized tracking purposes, the server may issue a tracking alert to the data processing system. The tracking alert may contain an action set to limit the ability of the data processing system to be used to perform unauthorized tracking. The action set may include generating an auditory and/or visual notification (e.g., making a noise, flashing lights, presenting a notification on the screen, etc.), locking the data processing system for use until a physical access of the data processing system is made, disabling a portion of functionality of the data processing system (e.g., location reporting functions) until the physical access is made, and/or making a report to an authority of the unauthorized tracking purpose for which the data processing system has been used.

Thus, embodiments disclosed herein may address, among other technical problems, the technical challenge of enabling unauthorized tracking activities to be detected, even when the data processing system is unpowered. To do so, the location data of a data processing system is provided to a server via out-of-band methods, allowing for the location of the data processing system to be monitored, even if the hardware components are unpowered. Using the location data of the data processing system, the location data of a second device with a known geographical relationship to the data processing system, and/or a device status report from the data processing system, a server may determine whether the data processing system may be being used for unauthorized tracking purposes and issue an alert to the data processing system. The data processing system may then perform an action set to update the operation of the data processing system to be less likely to be used to for unauthorized tracking purposes.

In an embodiment, a method for managing operation of a data processing system is disclosed. The method may include: providing, by a management controller of the data processing system and via an out-of-band communication channel, location data for the data processing system to a server to enable the server to identify whether the data processing system is being used for unauthorized tracking purposes, the location data indicating a geographical location of the data processing system; obtaining, by the management controller and via the out-of-band communication channel, an unauthorized tracking purpose analysis outcome determination; in a first instance of the obtaining, where the unauthorized tracking purpose analysis outcome determination indicates that the data processing system is be used to perform unauthorized tracking: performing an action set to update an existing operating state of the data processing system to a new operating state of the data processing system to limit an ability of the data processing system to be used to perform the unauthorized tracking; and in a second instance of the obtaining, where the unauthorized tracking purpose analysis outcome determination indicates that the data processing system is not being used to perform unauthorized tracking: continuing operation of the data processing system in the existing operating state.

The data processing system may include a network module adapted to separately advertise network endpoints for the management controller and hardware resources of the data processing system, the network endpoints being usable by a server to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

The location data may be generated by the network module.

The unauthorized tracking purpose may be tracking of a person without their consent.

The unauthorized tracking purpose analysis outcome determination may be based on: the location data of the data processing system; second location data for a device with a known geographical relationship to the data processing system; and a device status report regarding the data processing system.

The device status report for the data processing system may indicate whether the data processing system has been physically accessed by an authorized user within a predetermined amount of time.

The predetermined amount of time may be measured with respect to a start or an end of a geographic relationships between the data processing system and the device.

The action set may include at least one action selected from a group of actions consisting of: generating, by the data processing system, an auditory notification; generating, by the data processing system, a visual notification; locking the data processing system for use until a physical access of the data processing system is made; disabling a portion of functionality of the data processing system until the physical access of the data processing system is made; and making a report to an authority of the unauthorized tracking purpose for which the data processing system has been used.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, data processing system 100 may include portable devices that may provide computer-implemented services. Data processing system 100 may include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

To provide computer-implemented services, data processing system 100 may include out-of-band hardware components (e.g., a management controller) that may be used to report location data for the data processing system via an out-of-band communication channel. By reporting the location data using out-of-band components and via out-of-band communication channels, potentially compromised or inoperable hardware resources (e.g., in-band components) may be circumvented, decreasing the likelihood of the location data becoming compromised (e.g., unreliable).

For example, data processing system 100 may become lost or stolen while the hardware resources are unpowered.

Using an out-of-band communication channel, the geographical location data of data processing system 100 may be obtained by an authorized user, which may allow for its recovery.

However, a user with malicious intent may utilize the ability to obtain the location data of data processing system 100 to use data processing system 100 for unauthorized tracking purposes. For example, a user with malicious intent may place data processing system 100 in a person's car with or without their knowledge. The user with malicious intent may then obtain the location of the person's car without the person's consent by obtaining the location data from data processing system 100, even if it is unpowered.

In general, embodiments disclosed herein may provide methods, systems, and/or devices for managing out-of-band location capabilities of a data processing system. The data processing system may include out-of-band components that may manage location data for the data processing system and provide the location data to an external device accessible to an authorized user of the data processing system, refer to FIG. 1B. To manage the out-of-band capabilities of a data processing system, the system may detect when the data processing system is being used for unauthorized tracking purposes and take action to prevent the data processing system to continue to be used for unauthorized tracking purposes.

To perform the above-mentioned functionality, the system of FIG. 1A may include data processing system 100, server 102, and/or other devices 104. Data processing system 100, server 102, other devices 104, and/or any other type of devices not shown in FIG. 1A may perform all, or a portion of the computer-implemented services independently and/or cooperatively. Each of these components is discussed below.

Data processing system 100 may include any number and/or type of data processing systems. Data processing system 100 may provide computer-implemented services according to its geographical location. To do so, data processing system 100 may include out-of-band components, such as a management controller, capable of exchanging data with other devices via out-of-band communication channels.

For example, the management controller of data processing system 100 may (i) provide data usable for determining its location (e.g., location data) to a first device via out-of-band communication channels, (ii) obtain data (e.g., computing instructions) from a second device via out-of-band communication channels, (iii) facilitate updating of the operation of data processing system 100 (e.g., based on the computing instructions), and/or (iv) perform other actions relating to providing the computer-implemented services according to its location. For more information regarding out-of-band components of data processing system 100, refer to FIG. 1B. Data processing system 100 (e.g., the management controller) may provide location data to a device upon request (e.g., by the device) and/or automatically. For example, data processing system 100 may provide location data automatically (e.g., to registered devices) based on a schedule, upon (automatic) detection of a change (e.g., above a threshold) in location data, etc. Data processing system 100 may provide location data, for example, to server 102, which may participate in managing operation of data processing system 100.

For example, the management controller of data processing system 100 may provide the location data to server 102 in order to detect when data processing system 100 is being used for unauthorized activity, such as unauthorized tracking purposes. To detect when data processing system 100 is being used for unauthorized tracking purposes, server 102 may also obtain other location data and/or information from data processing system 100. For example, server 102 may also obtain location data of a second device with a known geographical relationship to data processing system 100 and/or a device status report from data processing system 100. If sever 102 determines data processing system 100 is being used for unauthorized tracking purposes, server 102 may issue a tracking alert to the management controller of data processing system 100, which may include an action set. The action set may include instructions to update the operating state of data processing system 100 to limit the ability of the data processing system to be used to perform unauthorized tracking.

To perform its functionality, server 102 may (i) obtain location data (e.g., via out-of-band communication channels, from the management controller of data processing system 100), (ii) monitor, manage and/or store location data (e.g., in a repository, not shown), (iii) obtain location requests from other devices (e.g., 104), (iv) perform location reporting processes to retrieve location data (e.g., from the repository), (v) provide responses to location requests (e.g., provide location data to other devices) and/or (vi) perform other tasks associated with managing the operation of data processing systems. For example, server 102 may obtain (e.g., access), store, and/or provide computing instructions (e.g., an action set) for updating operation of a data processing system if server 102 determines the data processing system is being used for unauthorized tracking purposes. The action set may include instructions for updating the operation of the data processing system to limit the ability of the data processing system to be used for unauthorized tracking purposes.

Server 102 may provide location data and/or other data (e.g., computing instructions) to a device upon request, and/or automatically (e.g., to registered devices) based on a schedule, upon (automatic) detection of a change (e.g., above a threshold) in location data, etc. For example, server 102 may provide location data to other devices 104 when requested by other devices 104.

Other devices 104 may include any number and/or type of user devices, servers, and/or other computing devices (e.g., that may request location data from server 102). For example, other devices 104 may include a personal device that may be operated by a user, and the personal device may include an application usable for participating in the management of the operation of data processing system 100.

For example, a device of other devices 104 may include functionality for (i) generating and/or providing (e.g., to server 102) a location request, (ii) obtaining location data (e.g., from server 102) in response to the location request, and/or (iii) providing computer-implemented services using the location data. The computer-implemented services may include, for example, geo-tracking services, device provisioning services, etc.

Thus, the location data of data processing system 100 may be obtained by a user of other devices 104 via out-of-band components of data processing system 100 using out-of-band communication channels. By doing so, the location data may be available even when in-band components of data processing system 100 are unable to reliably transmit location data (e.g., due to being inoperable, unpowered, etc.).

Figure 3:
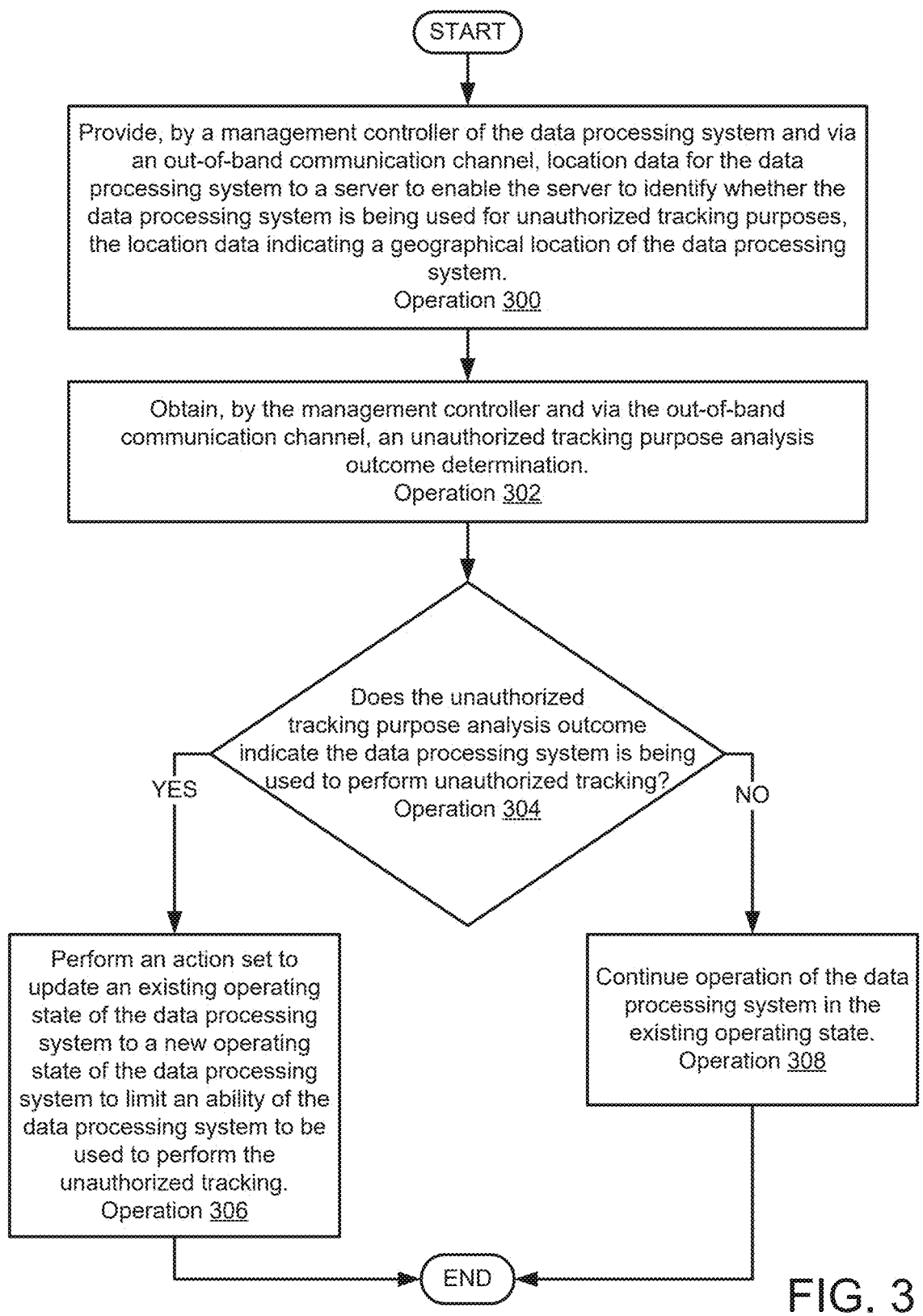
FIG. 3 shows a flow diagram illustrating a method of managing a data processing system in accordance with an embodiment.

When providing their functionality, any of data processing system 100, server 102, and/or other devices 104 may perform all, or a portion of the methods shown in FIG. 3.

Any of (and/or components thereof) data processing system 100, server 102, and/or other devices 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing system 100, server 102, and/or other devices 104 are implemented using an internet of things (IoT) device, which may include a computing device. The IoT device may operate in accordance with a communication model and/or management model known to data processing system 100, server 102, other devices 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single server (e.g., 102), it will be appreciated that the system may include any number of servers.

Turning to FIG. 1B, a diagram illustrating a data processing system in accordance with an embodiment is shown. The data processing system (e.g., data processing system 100) shown in FIG. 1B may be similar to any of the computing devices (e.g., data processing system 100) shown in FIG. 1A.

To provide computer-implemented services, data processing system 100 may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

In addition, different configurations of hardware resources 150 and/or software resources may be implemented by data processing system 100 based on the type of computer-implemented services that are to be provided. Modifications to configurations of hardware resources 150 and/or the software resources may lead to downtime for data processing system 100 and may consume network bandwidth of channel 170.

To reduce the downtime of data processing system 100 and to reduce the likelihood of the applications and/or other in-band entities from being indirectly compromised, data processing system 100 may include management controller 152 and network module 160. Each of these components of data processing system 100 is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100 via separate channels (e.g., 172) from the in-band components.

Management controller 152 may be implemented, for example, using a system on a chip or other type of independently operating computing device (e.g., independent from the in-band components, such as hardware resources 150, of a host data processing system 100). Management controller 152 may provide various management functionalities for data processing system 100. For example, management controller 152 may monitor various ongoing processes performed by the in-band components, may manage power distribution, thermal management, and/or other functions of data processing system 100.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100.

To facilitate communication with other devices, data processing system 100 may include network module 160. Network module 160 may provide communication services for in-band components and out-of-band components (e.g., management controller 152) of data processing system 100.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100 may include network module 160. Network module 160 may provide communication services for in-band components and out-of-band components (e.g., management controller 152) of data processing system 100. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 100 may appear to be two independent network entities, which may be independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIGS. 2A-2D.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment are shown in FIGS. 2A-2D. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 208, 230, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Some of the lines terminating in one or two arrows (e.g., 206, 220, etc.) are drawn in dashing to indicate, for example, that the corresponding interaction may or may not occur. For example, a request for data may not be necessary in a publish-subscribe system where one component subscribes to updates from another component thereby causing a copy of the data to be propagated to the component without an explicit request.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Some of the lines descending from the first set of shapes are interrupted with line breaks. The line breaks may indicate, for example, a passage of time (e.g., between interactions and/or processes occurring above the line break and below other interactions and/or processes occurring below the line break), during which activity and/or events may occur.

Some of the lines descending from some of the first set of shapes (e.g., 150) are drawn in dashing to indicate, for example, that the corresponding components may not be (i) operable, (ii) powered on, (iii) present in the system, and/or (iv) not participating in operation of the system for other reasons.

The processes shown in FIGS. 2A-2D may be performed by any entity shown in the systems of FIGS. 1A-1B (e.g., a device similar to one of data processing system 100, a server similar to server 102, etc.) and/or another entity without departing from embodiments disclosed herein.

Figure 2A:
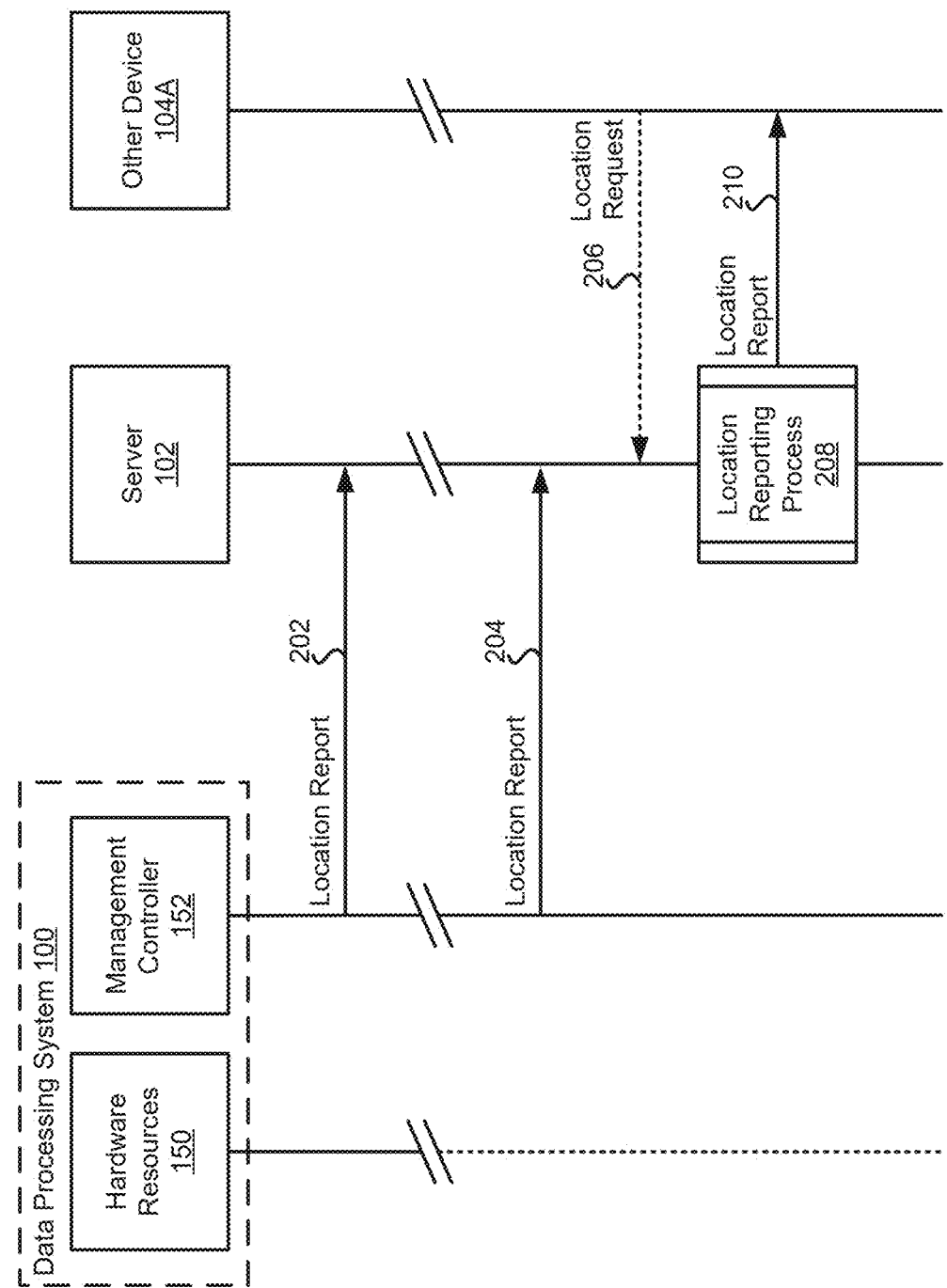
FIGS. 2A-2D show interaction diagrams in accordance with an embodiment.

Turning to FIG. 2A, a first interaction diagram in accordance with an embodiment is shown. The first interaction diagram may illustrate processes and interactions that may occur in order to obtain a location of a data processing system. For example, data processing system 100 may include a portable device that may provide computer-implemented services to a user of the portable device. As discussed with respect to FIGS. 1A-1B, data processing system 100 may include hardware resources 150 and management controller 152. Over time, management controller 152 may provide location data (e.g., usable to obtain a location of data processing system 100) to a server (e.g., 102).

At interaction 202, the location data may be provided to server 102 by management controller 152. For example, the location data may be generated (e.g., by a network module of data processing system 100) and provided (e.g., via an out-of-band communication channel that may use a network such as a WWAN) to server 102 via (i) transmission via a message, (ii) storing in a storage with subsequent retrieval by server 102, (iii) a publish-subscribe system where server 102 subscribes to updates from management controller 152 thereby causing a copy of the location data to be propagated to server 102, and/or (iv) other processes. By providing the location data to server 102, server 102 may provide location data management services.

To provide location data management services, server 102 may obtain the location data and/or store the location data (e.g., in a repository that may be managed by a database, not shown). As discussed with respect to FIG. 1A, management controller 152 may provide location data to server 102 periodically over time (e.g., based on a schedule, based on detected changes in location, etc.); therefore, server 102 may monitor (e.g., track and/or map) the location of data processing system 100 over time, and/or may store location history of data processing system 100.

The line breaks occurring after interaction 202 may indicate the passage of a period of time during which an event may occur. For example, the dashing line below the line break in the line descending from hardware resources 150 may indicate that, during the period of time, hardware resources 150 became unavailable (e.g., inoperable, unpowered, compromised, and/or may otherwise not be participating in operation of data processing system 100).

While hardware resources 150 are unavailable, management controller 152 may remain available (e.g., operable, powered, uncompromised, etc.) and may continue to provide location data to server 102 independently from the unavailable hardware resources 150. For example, if hardware resources 150 are unpowered, then hardware resources 150 may not be able to provide up to date (e.g., current) location data to server 102. Or, for example, if hardware resources 150 are compromised by a malicious party, then the malicious party may be able to intercept and/or modify the location data before providing it to server 102 (e.g., in order to spoof the location of data processing system 100). Therefore, by providing location data for data processing system 100 using out-of-band hardware (e.g., management controller 152) and via out-of-band communication channels, the location data may be more reliable than if the location data is provided using hardware resources 150 (via in-band communication channels).

At interaction 204, (current) location data may be provided to server 102 by management controller 152. Refer to the description of interaction 202 for more details regarding management controller 152 providing location data to server 102. By providing the (current) location data to server 102, server 102 may (continue to) provide location data management services and/or location services via other devices (e.g., 104).

For example, server 102 may provide location services (e.g., location tracking services) to other device 104A. Other device 104A may include a smartphone or other portable device accessible to a user (or administrator) of data processing system 100. For example, other device 104A may host an application running on server 102 usable to locate and/or track the location of data processing system 100. Using the application, the user may initiate a request for location services (e.g., a location request) in order to obtain a location of data processing system 100.

The location request may include (i) identifying information for the user of other device 104A, and/or the device for which the location services are requested (e.g., data processing system 100), (ii) authentication information (e.g., usable to authenticate the user and/or devices), and/or (iii) any other information usable for securely obtaining a location of data processing system 100.

At interaction 206, the location request may be provided to server 102 by other device 104A. For example, the location request may be generated (e.g., by an application hosted by other device 104A) and provided to server 102 via (i) transmission via a message, (ii) storing in a storage with subsequent retrieval by server 102, (iii) a publish-subscribe system where server 102 subscribes to updates from other devices (e.g., other device 104A) thereby causing a copy of the location request to be propagated to server 102, and/or (iv) other processes. By providing the location request to server 102, server 102 may provide location services.

To provide the location services, server 102 may perform location reporting process 208. Location reporting process 208 may be initiated, for example, by obtaining the location request from other device 104A. Location reporting process 208 may include performing authentication processes (e.g., to authenticate the user of other device 104A, and/or to verify that the authenticated user and/or other device 104A have authorization to access location data for data processing system 100). During location reporting process 208, server 102 may use historical and/or current location data (e.g., obtained by management controller 152) to map a location (or a series of locations over time) of data processing system 100.

Location reporting process 208 may include generating a response to the location request. The response may be based, at least in part, on the result of the authentication and/or verification processes. For example, if both the user and the device(s) are successfully authenticated, then the response may include location information (e.g., a location and a corresponding time, or a series of mapped locations and corresponding times) for data processing system 100; however, if both the user and the device(s) are not successfully authenticated, then the response may not include the location information and/or may include a message that may indicate that access to the location data for data processing system 100 is denied.

In some cases, server 102 may provide a location and/or corresponding time automatically (e.g., without first obtaining a location request from other device 104A). For example, if real-time location tracking is enabled for data processing system 100 in the application hosted by other device 104A, then server 102 may perform location reporting process 208 (e.g., periodically, without prompt from other device 104A), and/or may push the response to the application hosted by other device 104A.

At interaction 210, the response may be provided to other device 104A by server 102. For example, the response may be provided to other device 104A (e.g., the application hosted by other device 104A) via (i) transmission via a message, (ii) storing in a storage with subsequent retrieval by other device 104A, (iii) a publish-subscribe system where other device 104A subscribes to updates from server 102, thereby causing a copy of the response to be propagated to other device 104A, and/or (iv) other processes. By providing the response to other device 104A, other device 104A may provide location services for data processing system 100, allowing the user to obtain a location for data processing system 100.

Thus, as shown in the example of FIG. 2A, out-of-band components of a data processing system (e.g., a management controller) may be used to securely manage and/or provide location data (via out-of-band communication channels) to entities that may provide location services for the data processing system. By doing so, the location data that may support the location services may be more likely to be reliable and trusted for use in managing location-based operation of the data processing system.

Figure 2B:
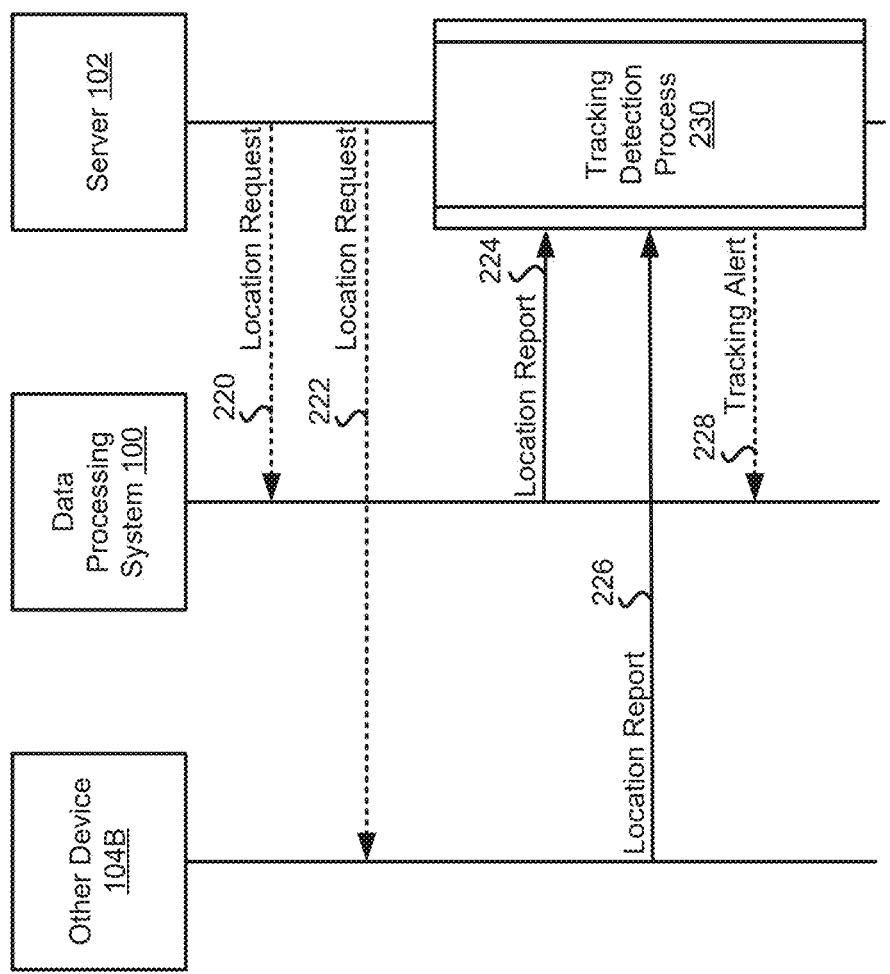

Turning to FIG. 2B, a second interaction diagram in accordance with an embodiment is shown. The second interaction diagram may illustrate processes and interactions that may detect whether a data processing system is being used for unauthorized tracking purposes using location data from both the data processing system and a device with a known geographical relationship with the data processing system.

For example, as discussed with respect to FIG. 2A, management controller 152 may provide location data for data processing system 100 to server 102. Server 102 may also obtain location data from other device 104B.

To address situations in which data processing system 100 is used for unauthorized tracking purposes, at interactions 220 and 222, server 102 may request location data from data processing system 100 and/or other device 104B, or the location data may be propagated to server 102 via interactions 224 and 226 without a location request (e.g., server 102 is subscribed to automatic updates) being sent to the respective devices.

Data processing system 100 and other device 104B may have a geographical relationship to each other which is known to server 102. The geographical relationship may include remaining within a predetermined distance from each other (e.g., within range of Bluetooth pairing). For example, data processing system 100 may be present at a first location and other device 104B may also be present at a first location within a distance threshold.

To detect whether data processing system 100 is being used for unauthorized tracking purposes, tracking detection process 230 may be performed using the location reports obtained via interactions 224-226. During tracking detection process 230, server 102 may monitor location data for both data processing system 100 and other device 104B in order to determine whether they remain within the distance threshold by obtaining location data in interactions 224 and 226. For example, the location data obtained by server 102 in interactions 224 and 226 may indicate that data processing system 100 and other device 104B have remained at the first location within their distance threshold, and therefore a tracking alert is not issued by server 102.

As the locations of data processing system 100 and other devices 104B continue to be monitored, server 102 may obtain location data indicating data processing system 100 has been moved from a first location to a second location, resulting in data processing system 100 being located outside of a distance threshold from other device 104B. Upon detecting the change in distance between data processing system 100 and other device 104B via tracking detection process 230, server 102 may issue a tracking alert to management controller 152 at interaction 228 (and/or may perform other operations to manage potential unauthorized tracking via data processing system 100).

The tracking alert issued by server 102 to management controller 152 may include an action set (and/or instructions for the action set) to limit the ability of the data processing system to be used to perform the unauthorized tracking. The action set may include instructions for data processing system 100 to generate an auditory and/or visual notification, lock data processing system 100 for use until a physical access of the data processing system is made, disable a portion of functionality of data processing system 100 until a physical access of the data processing system is made, and/or make a report to an authority of the unauthorized tracking purpose for which data processing system 100 was used.

Thus, as shown in FIG. 2B, location data for a data processing system and a second device with which the data processing system has a known geographical relationship may be used to detect whether a data processing system is being used for unauthorized tracking purposes.

Figure 2C:
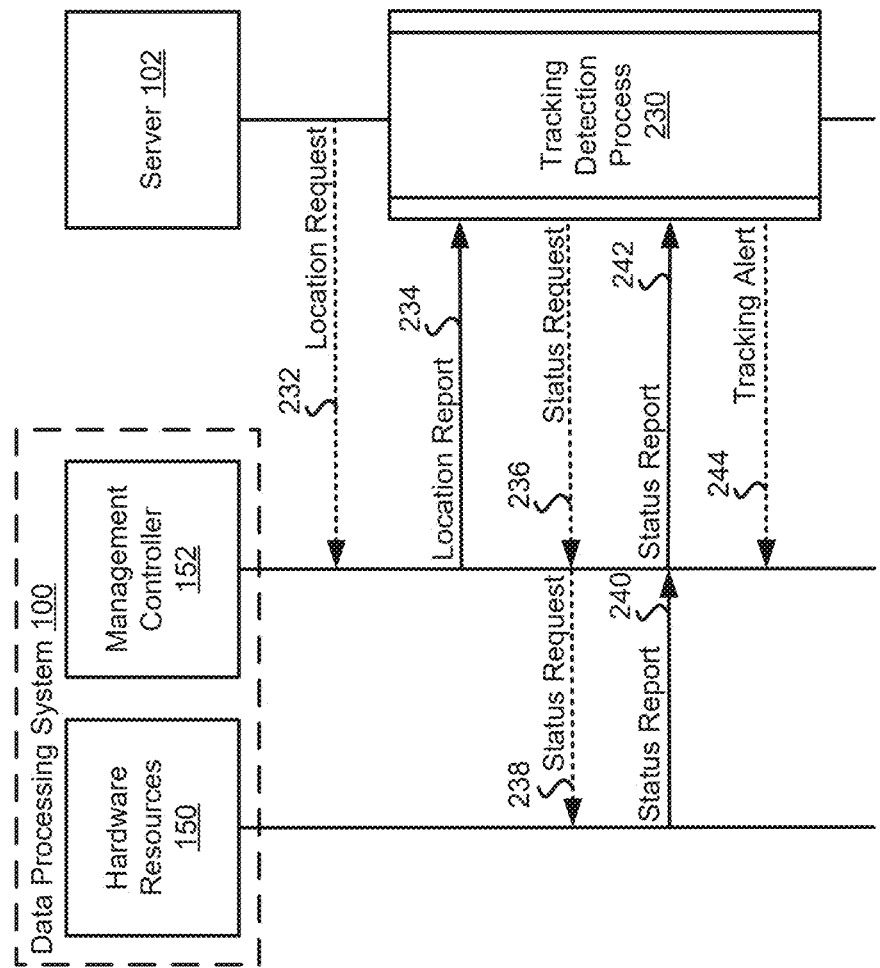

Turning to FIG. 2C, a third interaction diagram in accordance with an embodiment is shown. The third interaction diagram may illustrate processes and interactions that may detect whether a data processing system is being used for unauthorized tracking purposes using location data from the data processing system and a device status report from the data processing system.

For example, data processing system 100 may be present at a first location. As discussed with respect to FIGS. 2A-2B, management controller 152 may provide location data for data processing system 100 to server 102.

To identify and manage potential unauthorized tracking via data processing system 100, server 102 may obtain the location data from management controller 152 at interaction 234 after initiating a location request at interaction 232, and/or server 102 may receive the location data without a request (e.g., server 102 is subscribed to automatic updates) being sent to the respective devices.

Using the location data from management controller 152, server 102 may perform tracking detection process 230 to determine whether data processing system 100 is being used for unauthorized tracking purposes. To perform tracking detection process 230, server 102 may monitor the location data for data processing system 100 over time. For example, the location data obtained by server 102 may indicate that data processing system 100 has been moved from a first location to a second location (and/or via comparison to other movement patterns that may indicate that data processing system 100 is being used for unauthorized tracking purposes).

To perform tracking detection process 230, server 102 may also obtain a device status report for data processing system 100 from management controller 152 at interaction 242. Server 102 may obtain the device status report after initiating a device status request at interaction 236, and/or server 102 may receive the device status report without a request (e.g., server 102 is subscribed to automatic updates).

Management controller 152 may obtain the device status report from hardware resources 150 at interaction 240 in order to provide the device status report to server 102. Management controller 152 may receive the device status report after initiating a device status request at interaction 238, and/or management controller 152 may receive the device status report without a request (e.g., management controller 152 is subscribed to automatic updates).

The device status report for data processing system 100 may indicate whether the data processing system has been physically accessed by an authorized user within a predetermined amount of time. For example, the device status report may indicate whether the data processing system has been physically logged into and/or the time of the last log in.

During tracking detection process 230, server 102 may use the location data and the device status report to determine whether data processing system 100 is being used for unauthorized tracking purposes. For example, the location data received from management controller 152 may indicate data processing system 100 has been in multiple locations (e.g., the data processing system is being moved). Server 102 may then use the device status report to determine the time data processing system 100 was last physically accessed. If server 102 determines data processing system 100 is changing locations without being physically accessed (e.g., logged into) for a sufficiently long amount of time, server 102 may determine data processing system 100 is being used for unauthorized tracking purposes. Server 102 may then issue a tracking alert at interaction 244 to management controller 152 (and/or may perform other operations to manage potential unauthorized tracking via data processing system 100).

As discussed with respect to FIG. 2B, the tracking alert issued by server 102 to management controller 152 at interaction 244 may include an action set (and/or instructions for the action set) to limit the ability of the data processing system to be used to perform the unauthorized tracking. For more information regarding the action set, refer to FIG. 2B.

Thus, as shown in FIG. 2C, location data for a data processing system and a device status report from the data processing system indicating when the data processing system was last physically accessed may be used to detect whether a data processing system is being used for unauthorized tracking purposes.

Figure 2D:
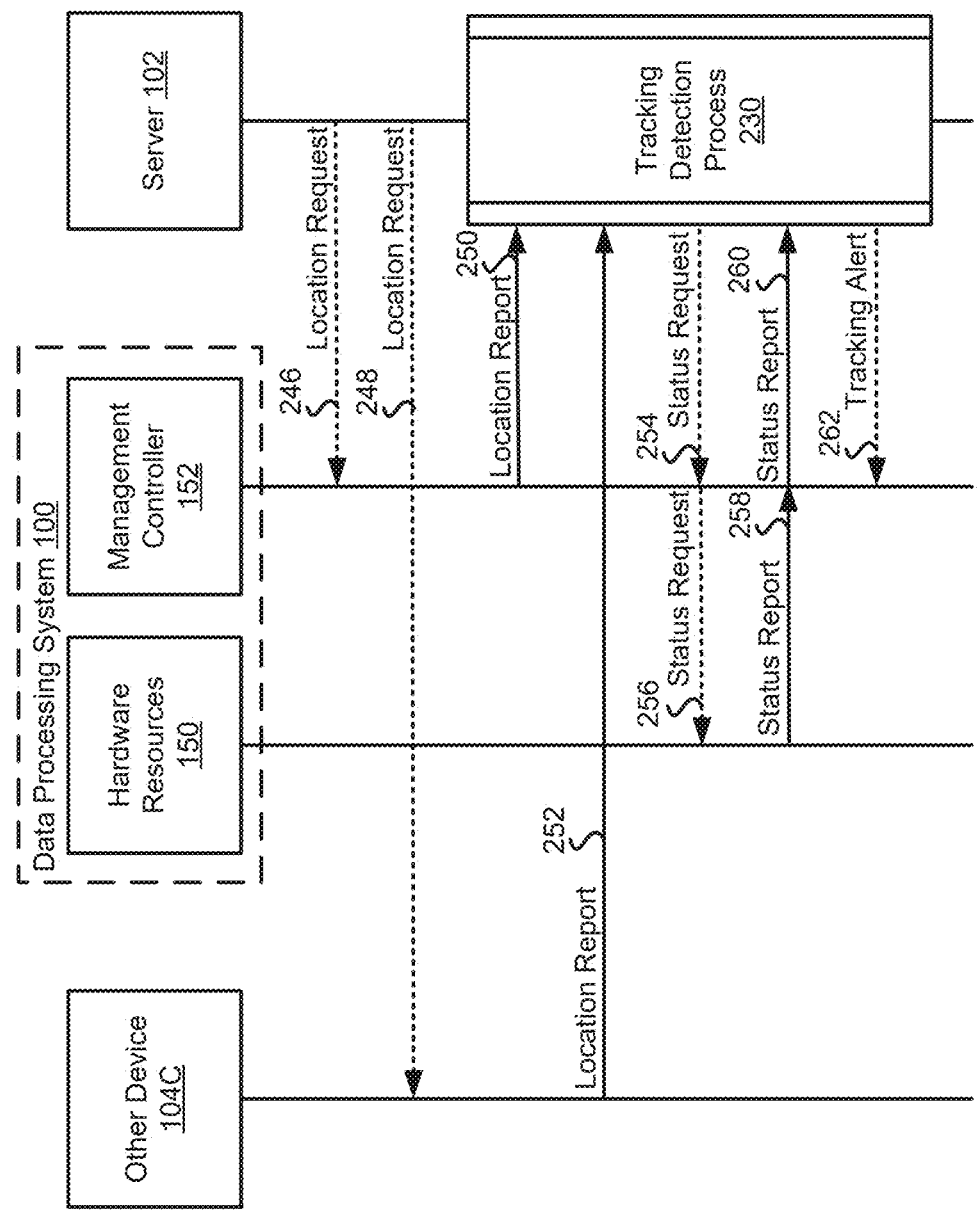

Turning to FIG. 2D, a fourth interaction diagram in accordance with an embodiment is shown. The fourth interaction diagram may illustrate processes and interactions that may detect whether a data processing system is being used for unauthorized tracking purposes using first location data from the data processing system and second location data from a second device.

To identify and manage potential unauthorized tracking via data processing system 100, as discussed with respect to FIGS. 2A-2C, management controller 152 may provide first location data for data processing system 100 to server 102. Server 102 may obtain the first location data from management controller 152 at interaction 250 after initiating a location request at interaction 246, and/or server 102 may receive the first location data without a request (e.g., server 102 is subscribed to automatic location updates from data processing system 100). Sever 102 may also obtain second location data from a second device, other device 104C, at interaction 252. Server 102 may obtain the second location data after initiating a location request at interaction 248, and/or server 102 may receive the second location data without a request (e.g., server 102 is subscribed to automatic location updates from other device 104C).

Using the first location data from data processing system 100 and the second location data from other device 104C, server 102 may perform tracking detection process 230 to determine whether data processing system 100 is being used for unauthorized tracking purposes. To perform tracking detection process 230, server 102 may monitor the first location data for data processing system 100 over time. While monitoring the first location of data processing system 100, server 102 may also monitor the second location data of other device 104C over time.

While monitoring the first location data of data processing system 100 and the second location data of other device 104C, server 102 may also obtain a device status report for data processing system 100 from management controller 152 at interaction 260. Server 102 may obtain the device status report after initiating a device status request at interaction 256, and/or server 102 may receive the device status report without a request (e.g., server 102 is subscribed to automatic updates from management controller 152).

Management controller 152 may obtain the device status report from hardware resources 150 at interaction 258 in order to provide the device status report to server 102. Management controller 152 may receive the device status report after initiating a device status request at interaction 256, and/or management controller 152 may receive the device status report without a request (e.g., management controller 152 is subscribed to automatic updates from hardware resources 150).

The device status report for data processing system 100 may indicate whether the data processing system has been physically accessed by an authorized user within a predetermined amount of time. For example, the device status report may indicate whether the data processing system has been physically logged into and/or the time of the last log in.

During tracking detection process 230, server 102 may use the first location data from data processing system 100, the second location data from other device 104C, and the device status report from data processing system 100 to determine whether data processing system 100 is being used for unauthorized tracking purposes. For example, the first location data received from management controller 152 and the second location data obtained from other device 104C may indicate data processing system 100 and other device 104C are physically separated (e.g., their physical locations are outside of a predetermined distance threshold). In this example, server 102 may determine data processing system 100 is not being used for unauthorized tracking purposes, and may not issue a tracking alert.

However, if the first location data obtained from data processing system 100 and the second location data obtained from other device 104C indicates data processing system 100 and other device 104C are within a predetermined distance threshold, server 102 may use the device status report from data processing system 100 to determine the time data processing system 100 was last physically accessed. If server 102 determines data processing system 100 has remained within a predetermined distance threshold from other device 104C without being physically accessed (e.g., logged into) for a sufficiently long amount of time, server 102 may determine data processing system 100 is being used for unauthorized tracking purposes (e.g., to track the user of other device 104C). Server 102 may then issue a tracking alert at interaction 262 to management controller 152 (and/or may perform other operations to manage potential unauthorized tracking via data processing system 100).

As discussed with respect to FIGS. 2B-2C, the tracking alert issued by server 102 to management controller 152 may include an action set (and/or instructions for the action set) to limit the ability of data processing system 100 to be used to perform the unauthorized tracking. For more information regarding the action set, refer to FIG. 2B.

Thus, as shown in FIG. 2D, first location data for a data processing system, second location data for a second device, and a device status report from the data processing system indicating when the data processing system was last physically accessed may be used to detect whether a data processing system is being used for unauthorized tracking purposes.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2D may perform various methods to manage the out-of-band location capabilities of data processing systems. FIG. 3 illustrates a method that may be performed by the components of the system of FIGS. 1A-2D. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method of managing a data processing system in accordance with an embodiment is shown. The method may be performed, for example, by a data processing system, a server, a communication system, a management controller of a data processing system, hardware resources of a data processing system, and/or any other entity without departing from embodiments disclosed herein.

At operation 300, the management controller of the data processing system may provide location data for the data processing system to a server. The location data may be provided to the server by (i) sending the location data to the server via a message, (ii) storing the location data in a storage location that will be check by the server in the future, (iii) communicated via publish-subscribe system where the server subscribes to updates regarding location data for the data process system, and/or via other methods. For example, to send the location data to the server, to avoid using any potentially unavailable hardware resources (e.g., in-band components) of the data processing system, the location data may be obtained by a network module of the data processing system and/or may be provided (e.g., transmitted) to the management controller via the out-of-band communication channel. The location data may indicate a geographical location of the data processing system. The location data may be provided using any of the methods described with respect to FIGS. 2A-2D and/or by other out-of-band communication methods.

Using the location data, the server may identify whether the data processing system is being used for unauthorized tracking purposes. The unauthorized tracking purposes may include tracking of a person without their consent.

To identify whether the data processing system is being used for unauthorized tracking purposes, the server may also obtain (i) second location data for a device with a known geographical relationship to the data processing system, (ii) a device status report regarding the data processing system, and/or (iii) other information.

Obtaining the second location data may include (i) reading the second location data from storage, (ii) receiving the second location data via an out-of-band communication channel using methods described with respect to FIG. 2A, and/or (iii) by other communication methods.

Obtaining a device status report may include (i) reading the device status report from storage, (ii) receiving the device status report via an out-of-band communication channel using methods described with respect to FIG. 2A, and/or (iii) by other communication methods.

The device status report for the data processing system may indicate whether the data processing system has been physically accessed by an authorized user within a predetermined amount of time.

The predetermined amount of time may be measured with respect to a start or an end of a geographic relationship between the data processing system and a device. For example, the predetermined amount of time may be measured with respect to when the data processing system is moved outside of a distance threshold from a device with which it is known to be geographically paired (e.g., known to be located physically near).

At operation 302, the management controller may obtain an unauthorized tracking purpose analysis outcome determination. The unauthorized tracking purpose analysis outcome determination may be obtained by (i) receiving the determination via a message from the server, (ii) retrieving the determination from storage, (iii) communicated via a publish-subscribe system where the management controller subscribes to updates regarding unauthorized tracking purpose analyses from the server, and/or (iv) via other methods. For example, the unauthorized tracking purpose analysis outcome determination may be obtained by a network module of the data processing system and/or may be provided (e.g., transmitted) to the management controller via the out-of-band communication channel. The unauthorized tracking purpose analysis outcome determination may be obtained via an out-of-band communication channel using methods described with respect to FIGS. 2A-2D and/or by other out-of-band communication methods.

At operation 304, it may be determined whether the unauthorized tracking purpose analysis outcome indicates the data processing system is being used to perform unauthorized tracking. For example, the determination may be made by parsing the unauthorized tracking purpose analysis outcome to ascertain what it indicates.

If it is determined that the unauthorized tracking purpose analysis outcome indicates the data processing system is being used to perform unauthorized tracking (e.g., the determination is "Yes" at operation 304), then the method may proceed to operation 306.

At operation 306, an action set may be performed to update an existing operating state of the data processing system to a new operating state of the data processing system to limit an ability of the data processing system to be used to perform the unauthorized tracking. The action set may be performed, for example, by (i) reading the action set from storage and initiating performance of actions based on the data that was read from storage, (ii) dynamically generating the action set based on any number of factors and initiating performance of actions based on the dynamically generated action set, (iii) obtaining the action set from another device and initiating performance of actions based on the obtained action set, and/or (iv) via other methods.

For example, performing the action set may include: (i) generating, by the data processing system, an auditory notification (e.g., powering a speaker to generate the auditory notification), (ii) generating, by the data processing system, a visual notification (e.g., displaying information on a display), (iii) locking the data processing system for use until a physical access of the data processing system is made (e.g., modifying a security state of the data processing system to prevent the use of the data processing system), (iv) disabling a portion of functionality of the data processing system until the physical access of the data processing system is made (e.g., disabling hardware/software components of the data processing system), (v) making a report to an authority of the unauthorized tracking purpose for which the data processing system has been used (e.g., generating and sending a data structure that includes information indicating that unauthorized tracking may be being performed using the data processing system), and/or (vi) other methods.

The method may end following operation 306.

Returning to operation 304, if it is determined that the unauthorized tracking purpose analysis outcome does not indicate the data processing system is being used to perform unauthorized tracking (e.g., the determination is "No" at operation 304), then the method may proceed to operation 308.

At operation 308, the operation of the data processing system may continue in the existing operating state. The operation of the data processing system may be made to continue by not making any changes to the data processing system based on use of the location reporting services provided by the data processing system.

The method may end following operation 308.

Using the methods illustrated in FIG. 3, embodiments disclosed herein may provide systems and methods usable to manage data processing systems to increase the likelihood of detecting the use of data processing systems for unauthorized tracking purposes.

Figure 4:
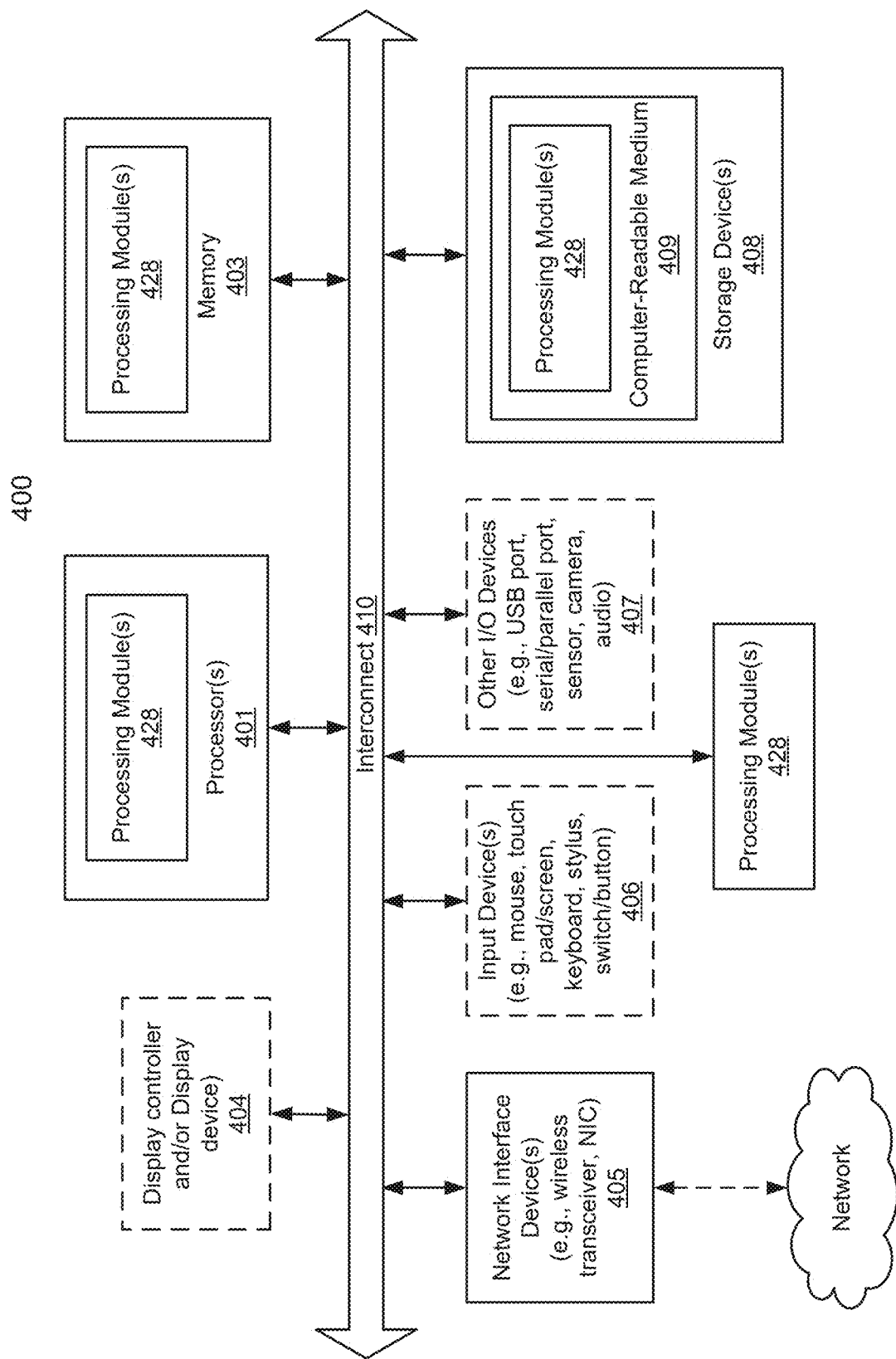
FIG. 4 shows a block diagram illustrating a data processing system in accordance with an embodiment.

Any of the components illustrated in FIGS. 1A-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
  providing, by a management controller of the data processing system and via an out-of-band communication channel, location data for the data processing system to a server to enable the server to identify whether the data processing system is being used for unauthorized tracking, the location data indicating a geographical location of the data processing system and the unauthorized tracking being a tracking of a person without their consent;

obtaining, by the management controller and via the out-of-band communication channel, an unauthorized tracking purpose analysis outcome determination;

in a first instance of the obtaining, where the unauthorized tracking purpose analysis outcome determination indicates that the data processing system is being used to perform unauthorized tracking:

performing an action set to update an existing operating state of the data processing system to a new operating state of the data processing system to limit an ability of the data processing system to be used to perform the unauthorized tracking, wherein the action set comprises at least one action selected from a group of actions consisting of:
generating, by the data processing system, an auditory notification;
generating, by the data processing system, a visual notification;
locking the data processing system for use until a physical access of the data processing system is made;
disabling a portion of functionality of the data processing system until the physical access of the data processing system is made; and
making a report to an authority of the unauthorized tracking for which the data processing system has been used; and in a second instance of the obtaining, where the unauthorized tracking purpose analysis outcome determination indicates that the data processing system is not being used to perform unauthorized tracking:
continuing operation of the data processing system in the existing operating state.

2. The method of claim 1, wherein the data processing system comprises a network module adapted to separately advertise network endpoints for the management controller and hardware resources of the data processing system, the network endpoints being usable by a server to address communications to the hardware resources using an in-band communication channel and the management controller using the out-of-band communication channel.

3. The method of claim 2, wherein the management controller and the network module are on separate power domains from the hardware resources so that the management controller and the network module are operable while the hardware resources are inoperable.

4. The method of claim 2, wherein the out-of-band communication channel runs through the network module, and an in-band communication channel that services the hardware resources also runs through the network module.

5. The method of claim 2, wherein the network module hosts a transmission control protocol/internet protocol (TCP/IP) stack to facilitate network communications via the out-of-band communication channel.

6. The method of claim 2, wherein the location data is generated by the network module.

7. The method of claim 1, wherein the unauthorized tracking purpose analysis outcome determination is based on:
the location data of the data processing system;
second location data for a device with a known geographical relationship to the data processing system; and
a device status report regarding the data processing system.

8. The method of claim 7, wherein the device status report for the data processing system indicates whether the data processing system has been physically accessed by an authorized user within a predetermined amount of time.

9. The method of claim 8, wherein the predetermined amount of time is measured with respect to a start or an end of a geographic relationships between the data processing system and the device.

10. A non-transitory machine-readable medium having instructions stored therein, which when executed by a processor, cause the processor to perform operations for managing operation of a data processing system, the operations comprising:

providing, by a management controller of the data processing system and via an out-of-band communication channel, location data for the data processing system to a server to enable the server to identify whether the data processing system is being used for unauthorized tracking, the location data indicating a geographical location of the data processing system and the unauthorized tracking being a tracking of a person without their consent;

obtaining, by the management controller and via the out-of-band communication channel, an unauthorized tracking purpose analysis outcome determination;

in a first instance of the obtaining, where the unauthorized tracking purpose analysis outcome determination indicates that the data processing system is be used to perform unauthorized tracking:

performing an action set to update an existing operating state of the data processing system to a new operating state of the data processing system to limit an ability of the data processing system to be used to perform the unauthorized tracking, wherein the action set comprises at least one action selected from a group of actions consisting of:
generating, by the data processing system, an auditory notification;
generating, by the data processing system, a visual notification;
locking the data processing system for use until a physical access of the data processing system is made;
disabling a portion of functionality of the data processing system until the physical access of the data processing system is made; and
making a report to an authority of the unauthorized tracking for which the data processing system has been used; and in a second instance of the obtaining, where the unauthorized tracking purpose analysis outcome determination indicates that the data processing system is not being used to perform unauthorized tracking:
continuing operation of the data processing system in the existing operating state.

11. The non-transitory machine-readable medium of claim 10, wherein the data processing system comprises a network module adapted to separately advertise network endpoints for the management controller and hardware resources of the data processing system, the network endpoints being usable by a server to address communications to the hardware resources using an in-band communication channel and the management controller using the out-of-band communication channel.

12. The non-transitory machine-readable medium of claim 11, wherein the management controller and the network module are on separate power domains from the hardware resources so that the management controller and the network module are operable while the hardware resources are inoperable.

13. The non-transitory machine-readable medium of claim 11, wherein the out-of-band communication channel runs through the network module, and an in-band communication channel that services the hardware resources also runs through the network module.

14. The non-transitory machine-readable medium of claim 11, wherein the network module hosts a transmission control protocol/internet protocol (TCP/IP) stack to facilitate network communications via the out-of-band communication channel.

15. A data processing system, comprising:
a processor; and
a memory coupled to the processor to store instructions, which when executed by the processor, cause the processor to perform operations for managing operation of a data processing system, the operations comprising:
providing, by a management controller of the data processing system and via an out-of-band communication channel, location data for the data processing system to a server to enable the server to identify whether the data processing system is being used for unauthorized tracking, the location data indicating a geographical location of the data processing system and the unauthorized tracking being a tracking of a person without their consent;
obtaining, by the management controller and via the out-of-band communication channel, an unauthorized tracking purpose analysis outcome determination;
in a first instance of the obtaining, where the unauthorized tracking purpose analysis outcome determination indicates that the data processing system is be used to perform unauthorized tracking:
performing an action set to update an existing operating state of the data processing system to a new operating state of the data processing system to limit an ability of the data processing system to be used to perform the unauthorized tracking, wherein the action set comprises at least one action selected from a group of actions consisting of:
generating, by the data processing system, an auditory notification;
generating, by the data processing system, a visual notification;
locking the data processing system for use until a physical access of the data processing system is made;
disabling a portion of functionality of the data processing system until the physical access of the data processing system is made; and
making a report to an authority of the unauthorized tracking for which the data processing system has been used; and
in a second instance of the obtaining, where the unauthorized tracking purpose analysis outcome determination indicates that the data processing system is not being used to perform unauthorized tracking:
continuing operation of the data processing system in the existing operating state.

16. The data processing system of claim 15, wherein the data processing system comprises a network module adapted to separately advertise network endpoints for the management controller and hardware resources of the data processing system, the network endpoints being usable by a server to address communications to the hardware resources using an in-band communication channel and the management controller using the out-of-band communication channel.

17. The data processing system of claim 16, wherein the management controller and the network module are on separate power domains from the hardware resources so that the management controller and the network module are operable while the hardware resources are inoperable.

18. The data processing system of claim 16, wherein the out-of-band communication channel runs through the network module, and an in-band communication channel that services the hardware resources also runs through the network module.

19. The non-transitory machine-readable medium of claim 10, wherein the unauthorized tracking purpose analysis outcome determination is based on:
the location data of the data processing system;
second location data for a device with a known geographical relationship to the data processing system; and
a device status report regarding the data processing system.

20. The non-transitory machine-readable medium of claim 19, wherein the device status report for the data processing system indicates whether the data processing system has been physically accessed by an authorized user within a predetermined amount of time.

* * * * *